(12) United States Patent
Kwak et al.

(10) Patent No.: US 10,665,828 B2
(45) Date of Patent: May 26, 2020

(54) RECHARGEABLE BATTERY

(71) Applicant: Samsung SDI Co., Ltd., Yongin-si, Gyeonggi-do (KR)

(72) Inventors: Yoon-Tai Kwak, Yongin-si (KR); Sang-Won Byun, Yongin-si (KR); Kwan-Hyung Lee, Yongin-si (KR)

(73) Assignee: Samsung SDI Co., Ltd., Gyoenggi-do (KR)

( * ) Notice: Subject to any disclaimer, the term of this patent is extended or adjusted under 35 U.S.C. 154(b) by 640 days.

(21) Appl. No.: 15/144,719

(22) Filed: May 2, 2016

(65) Prior Publication Data

US 2016/0372721 A1 Dec. 22, 2016

(30) Foreign Application Priority Data

Jun. 16, 2015 (KR) .......................... 10-2015-0085181

(51) Int. Cl.
*H01M 2/06* (2006.01)
*H01M 2/26* (2006.01)
(Continued)

(52) U.S. Cl.
CPC .............. *H01M 2/06* (2013.01); *H01M 2/024* (2013.01); *H01M 2/1653* (2013.01); *H01M 2/26* (2013.01);
(Continued)

(58) Field of Classification Search
CPC ......... H01M 10/0431; H01M 10/0525; H01M 2004/027; H01M 2004/028;
(Continued)

(56) References Cited

U.S. PATENT DOCUMENTS

2002/0110729 A1* 8/2002 Hozumi .................... H01G 4/32
429/130
2003/0003356 A1* 1/2003 Tsukamoto ........... H01M 2/027
429/176
(Continued)

FOREIGN PATENT DOCUMENTS

CN          1905245 A    1/2007
CN        102347467 A    2/2012
(Continued)

OTHER PUBLICATIONS

Extended European Search Report dated Jun. 6, 2016 for European Patent Application No. 16154752.6.
(Continued)

*Primary Examiner* — Lingwen R Zeng
(74) *Attorney, Agent, or Firm* — Knobbe, Martens, Olson & Bear LLP

(57) ABSTRACT

An exemplary embodiment of the present disclosure provides a rechargeable battery including: an electrode assembly that includes a first electrode, a second electrode, and a separator interposed between the first electrode and the second electrode; a case that accommodates the electrode assembly, in one lateral surface of which a hole is formed, and that includes an opening formed in another lateral surface facing the one lateral surface; a sealing portion that is connected to the hole and seals the hole so that a lateral surface of the case is flattened; a cap plate combined with the opening; and a second terminal that is connected to the second electrode and is protruded outside the case while passing through the cap plate, wherein the hole may have a shape recessed toward the electrode assembly with respect to a surface of the case.

11 Claims, 6 Drawing Sheets

(51) Int. Cl.
*H01M 2/30* (2006.01)
*H01M 2/16* (2006.01)
*H01M 10/0525* (2010.01)
*H01M 4/587* (2010.01)
*H01M 4/66* (2006.01)
*H01M 4/131* (2010.01)
*H01M 4/485* (2010.01)
*H01M 2/02* (2006.01)
*H01M 4/133* (2010.01)
*H01M 10/04* (2006.01)
*H01M 2/04* (2006.01)
*H01M 4/02* (2006.01)

(52) U.S. Cl.
CPC ............ *H01M 2/30* (2013.01); *H01M 2/305* (2013.01); *H01M 4/131* (2013.01); *H01M 4/133* (2013.01); *H01M 4/485* (2013.01); *H01M 4/587* (2013.01); *H01M 4/661* (2013.01); *H01M 10/0431* (2013.01); *H01M 10/0525* (2013.01); *H01M 2/0217* (2013.01); *H01M 2/0473* (2013.01); *H01M 2/263* (2013.01); *H01M 2004/027* (2013.01); *H01M 2004/028* (2013.01); *H01M 2220/20* (2013.01)

(58) Field of Classification Search
CPC .......... H01M 2220/20; H01M 2/0217; H01M 2/024; H01M 2/0473; H01M 2/06; H01M 2/1653; H01M 2/26; H01M 2/263; H01M 2/30; H01M 2/305; H01M 4/131; H01M 4/133; H01M 4/485; H01M 4/587; H01M 4/661
See application file for complete search history.

(56) References Cited

U.S. PATENT DOCUMENTS

| | | |
|---|---|---|
| 2007/0026307 A1 | 2/2007 | Kim |
| 2010/0009253 A1 | 1/2010 | Mao et al. |
| 2010/0233519 A1* | 9/2010 | Cheon .................. H01M 2/34 429/56 |
| 2011/0117404 A1 | 5/2011 | Ahn et al. |
| 2012/0021274 A1 | 1/2012 | Kim et al. |
| 2012/0052349 A1 | 3/2012 | Kim et al. |
| 2012/0196160 A1 | 8/2012 | Guen |
| 2013/0230759 A1 | 9/2013 | Jeong et al. |
| 2014/0141319 A1 | 5/2014 | Kim et al. |
| 2014/0205897 A1 | 7/2014 | Byun et al. |
| 2014/0377639 A1 | 12/2014 | Kwak et al. |

FOREIGN PATENT DOCUMENTS

| | | |
|---|---|---|
| CN | 102623652 A | 8/2012 |
| CN | 103840120 A | 6/2014 |
| CN | 103943809 A | 7/2014 |
| CN | 104241560 A | 12/2014 |
| CN | 204155967 U | 2/2015 |
| EP | 2424007 | 2/2012 |
| EP | 2424007 A1 | 2/2012 |
| JP | 2010-135242 A | 6/2010 |
| KR | 10-2009-0095548 A | 9/2009 |
| KR | 10-2012-0053589 A | 5/2012 |
| KR | 10-2012-0080148 A | 7/2012 |

OTHER PUBLICATIONS

Office Action dated Jun. 1, 2017 for European Application No. 16 154 752.6.
The First Chinese Office Action dated Sep. 20, 2019 for Chinese Patent Application No. Cn 201610016537.6 which shares priority of Korean Patent Application No. KR 10-2015-0085181 with subject U.S. Appl. No. 15/144,719.
Chinese Office Action dated Mar. 24, 2020 for Chinese Patent Application No. CN 201610016537.6 which corresponds to the subject U.S. Appl. No. 15/144,719. No English Translation is available for the Chinese Office Action at this time.

* cited by examiner

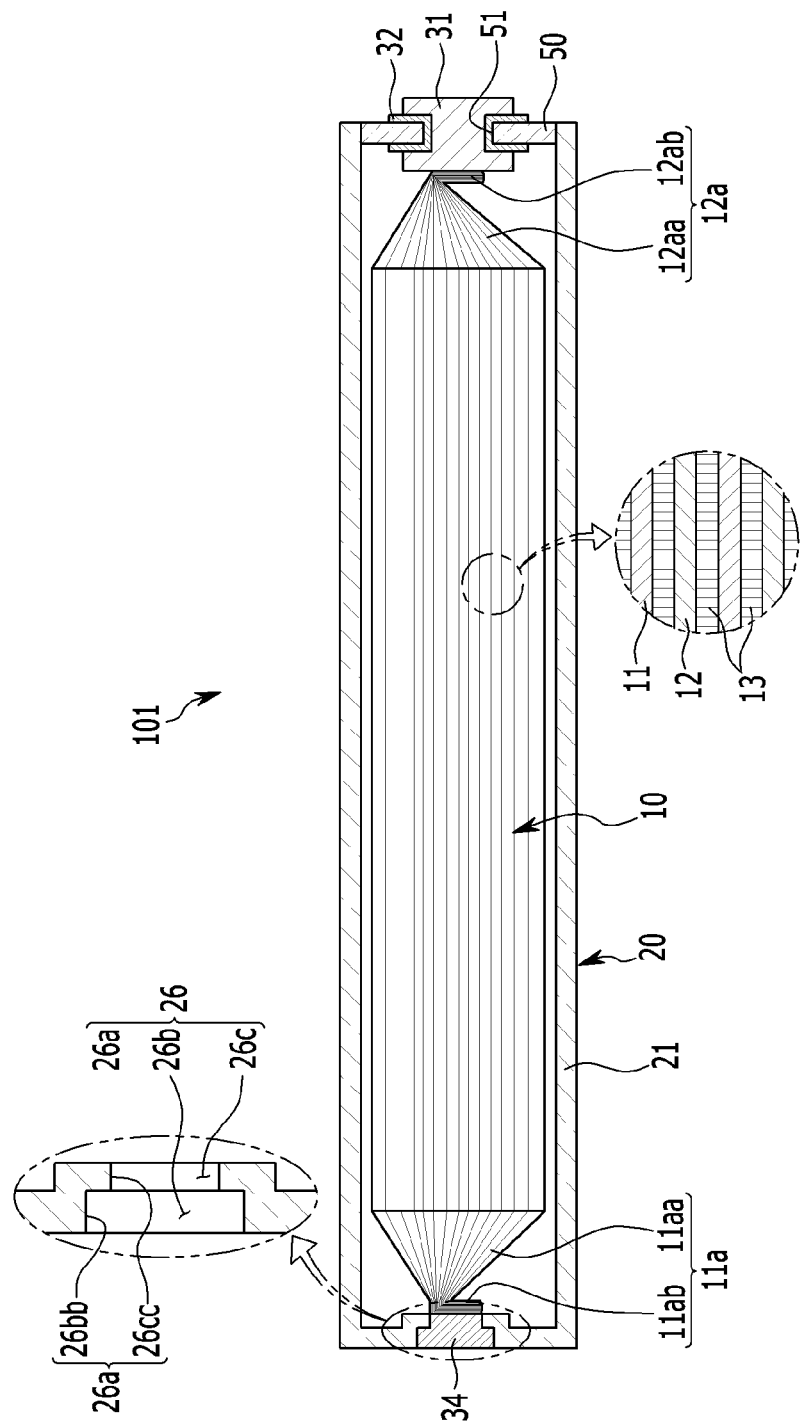

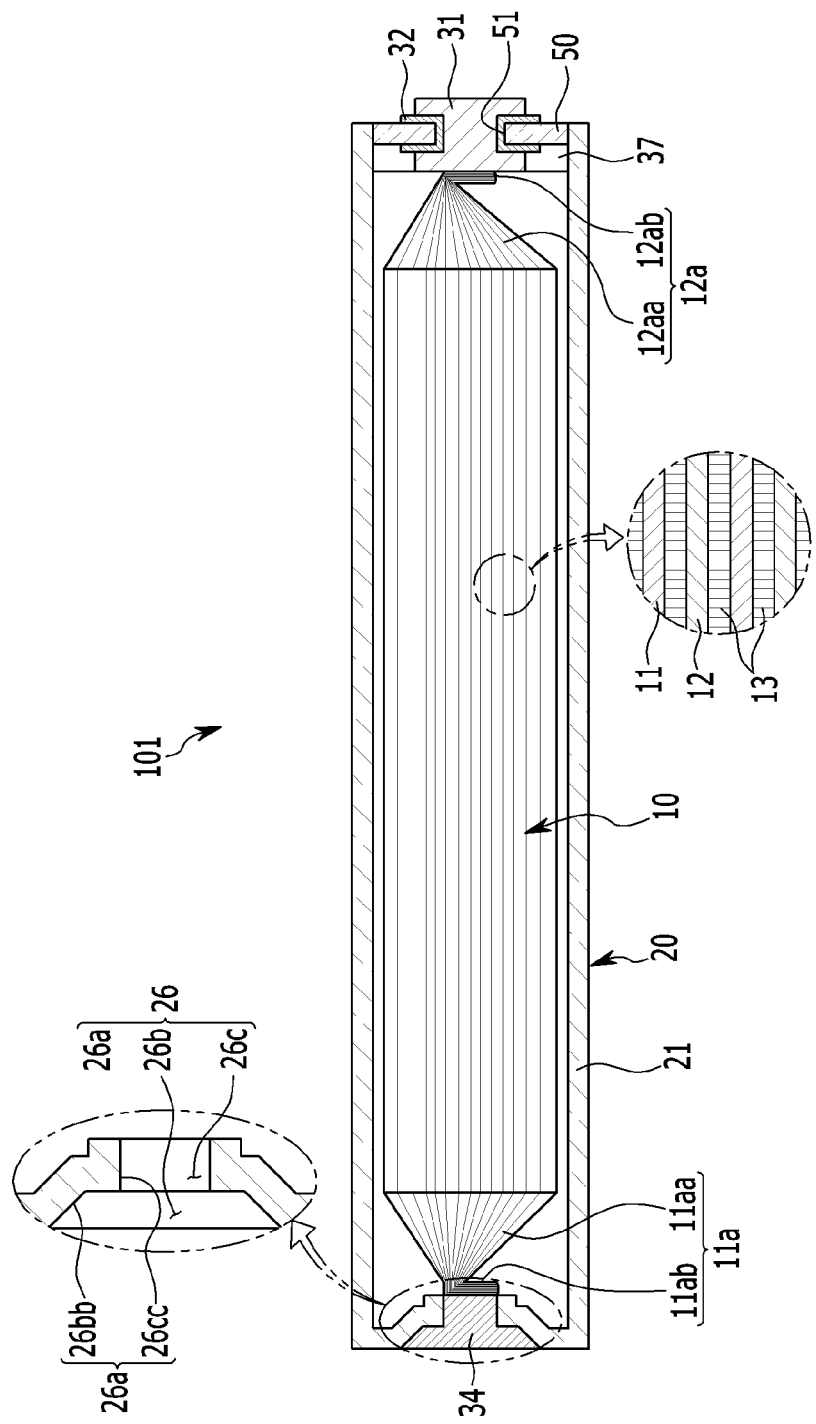

RECHARGEABLE BATTERY

RELATED APPLICATIONS

This application claims priority to and the benefit of Korean Patent Application No. 10-2015-0085181 filed in the Korean Intellectual Property Office on Jun. 16, 2015, the entire contents of which are incorporated herein by reference.

BACKGROUND

Field

The present disclosure relates to a rechargeable battery.

Description of the Related Art

A rechargeable battery differs from a primary battery in that it can be repeatedly charged and discharged, while the latter is incapable of being recharged. Research has been actively conducted for applying the rechargeable battery to high technology fields, and as a result, the rechargeable battery is commercially available and widely used.

Recently, large capacity/high power rechargeable batteries using a non-aqueous electrolyte and having a high energy density have been developed, and the rechargeable batteries are connected in series and/or parallel, thereby forming a large capacity/high power battery module in order to be able to be used in power storage applications and in devices that requires high powers.

Such a rechargeable battery, which may be referred to as a battery cell, is manufactured in various shapes such as a cylindrical, prismatic, or pouch shape, and a medium to large battery module that requires high power is configured to include a cylindrical or prismatic rechargeable battery that can easily implement high capacity.

In order to form the battery cell, an electrode assembly that is formed by interposing a separator acting as an insulator between positive and negative electrodes and an electrolyte solution are accommodated in a case at which a cap plate is installed. In this case, a positive electrode terminal and a negative terminal are connected to the electrode assembly, and they are formed to be protruded outside through the cap plate.

When a battery module is formed by electrically connecting the battery cells, since the electrode terminals of the conventional art are fixed in a single direction, an additional space for connecting the electrode terminals is required, and thus the volume of the battery module increases. Further, since a circuit and the like for the battery module should be disposed on an upper portion of where the electrode terminals are disposed, flexibility for forming of the battery module decreases and user's selectivity is limited.

Moreover, in some applications, such as electric vehicles, when the electrode terminals on the battery cell protrude from the upper portion of the battery cell, the height of the cell is increased, which may cause the height of electric vehicles housing the cells to increase.

The above information disclosed in this Background section is only to enhance the understanding of the background of the disclosure and therefore it may contain information that does not form the prior art that is already known in this country to a person of ordinary skill in the art.

SUMMARY OF CERTAIN INVENTIVE ASPECTS

The present disclosure has been made in an effort to provide a rechargeable battery that may be arranged in a compact structure to occupy a small volume when a battery module is configured, may improve flexibility of a position at which a circuit for the battery module is formed, and may reduce a height of the battery module.

Technical objects desired to be achieved in the present disclosure are not limited to the aforementioned objects, and other technical objects not described above will be apparent to those skilled in the art from the disclosure of the present disclosure.

An exemplary embodiment of the present disclosure provides a rechargeable battery including: an electrode assembly that includes a first electrode, a second electrode, and a separator interposed between the first electrode and the second electrode; a case that accommodates the electrode assembly, in one lateral surface of which a hole is formed, and that includes an opening formed in another lateral surface facing the one lateral surface; a sealing portion that forms a first terminal that is connected to the hole and seals the hole so that a lateral surface of the case is flattened; a cap plate combined with the opening; and a second terminal that is connected to the second electrode and is protruded outside the case while passing through the cap plate, wherein the hole may include a shape recessed toward the electrode assembly with respect to a surface of the case.

The recessed shape may form a step with respect to the surface of the case. In the step, a size of the hole formed in the one lateral surface of the case may be larger than that of a hole of the shape recessed toward the electrode assembly.

The sealing portion may be positioned in the larger hole in the lateral surface of the case.

The sealing portion may be positioned in both the larger hole and the recessed hole in the lateral surface of the case.

The sealing portion may include a tilted outer surface to contact the tilted lateral wall.

The recessed shape may include a lateral wall perpendicular to the surface of the case.

The recessed shape may include a lateral wall tilted to the surface of the case.

The sealing portion may be formed of the same material as the case and may be directly bonded to an uncoated region formed in the first electrode.

If necessary, the sealing portion may form a first terminal connected to the first electrode.

The first terminal may be formed to pass through the hole and may be combined with the hole to not be protruded from the surface of the case.

An insulating member may be disposed between the second terminal and the cap plate, and an uncoated region formed in the second electrode may be directly combined with the second terminal.

According to embodiments of the present disclosure, a rechargeable battery may include a hole (or an opening) formed in one lateral surface of a case and having a shape recessed in a direction of an electrode assembly, such that a positive electrode terminal and a negative electrode terminal may be respectively formed on opposite surfaces of the case or only a single terminal may be included therein. When a battery module is configured with such rechargeable batteries, a circuit for the battery module may be designed and formed on a lateral area of the battery module in addition to an upper area of the battery module depending on the designer's convenience, and an overall height of the battery module may decrease and the rechargeable batteries may be arranged in a compact structure, thereby increasing the capacity of the battery module in the same volume.

BRIEF DESCRIPTION OF THE DRAWINGS

FIG. 5 illustrates a longitudinal cross-sectional view of a rechargeable battery according to a third exemplary embodiment of the present disclosure.

FIG. 6 illustrates a longitudinal cross-sectional view of a rechargeable battery according to a fourth exemplary embodiment of the present disclosure.

DETAILED DESCRIPTION OF CERTAIN INVENTIVE EMBODIMENTS

Figure 1:
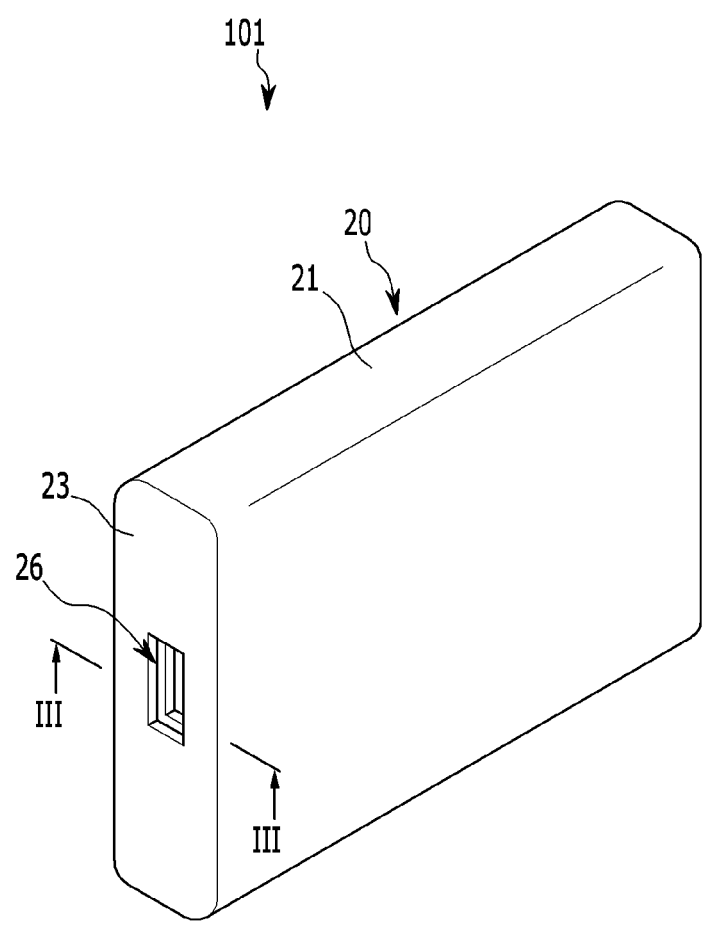
FIG. 1 illustrates a perspective view of a rechargeable battery according to a first exemplary embodiment of the present disclosure.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Further, in the drawings, size and thickness of each element are arbitrarily illustrated for ease of description, and the present disclosure is not necessarily limited to such size and thickness illustrated in the drawings.

In addition, unless explicitly described to the contrary, the word "comprise" and variations such as "comprises" or "comprising" will be understood to imply the inclusion of stated elements but not the exclusion of any other elements.

Figure 2:
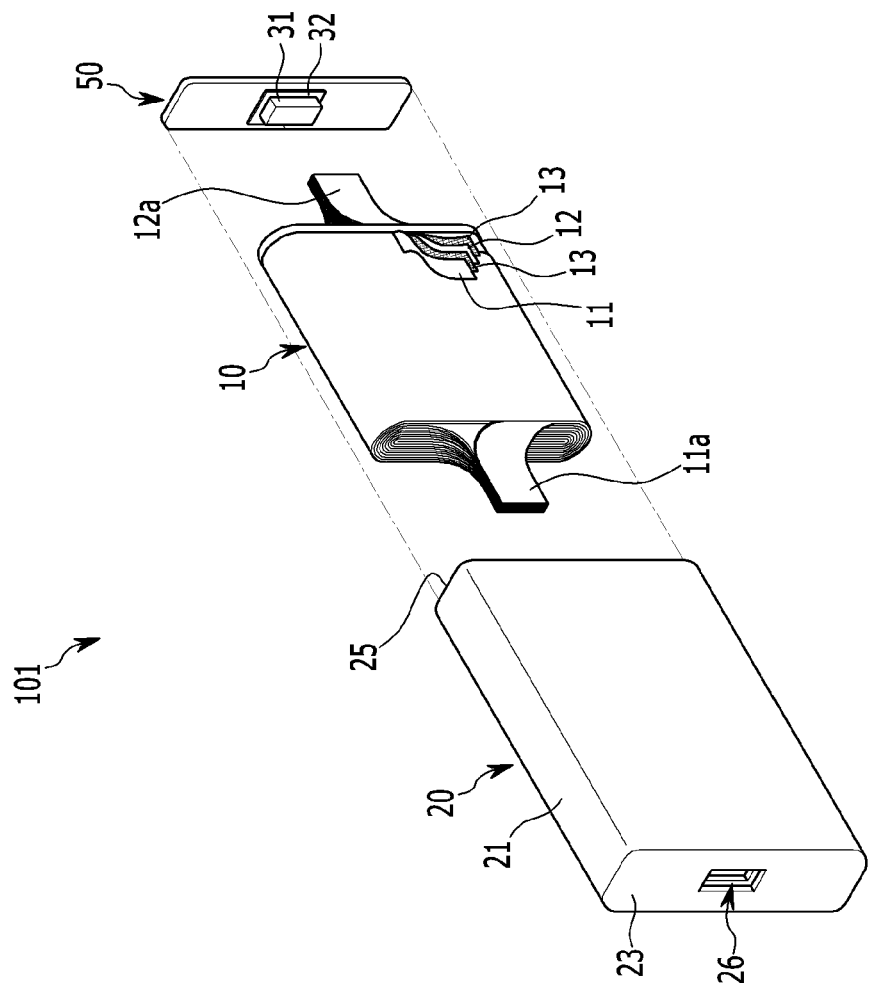
FIG. 2 illustrates an exploded perspective view of the rechargeable battery according to the first exemplary embodiment of the present disclosure.
Figure 3:
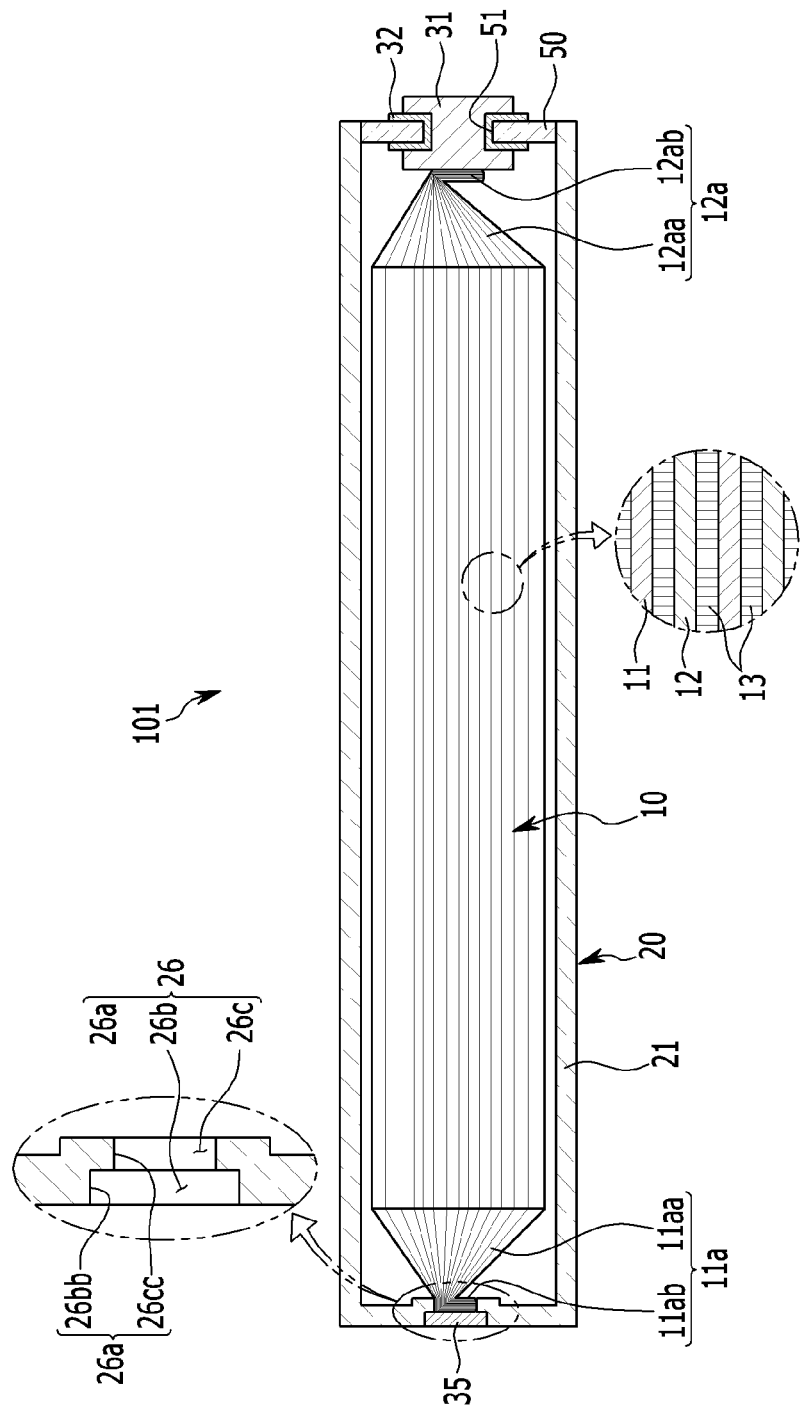
FIG. 3 illustrates a longitudinal cross-sectional view taken along line of FIG. 1.

FIG. 1 illustrates a perspective view of a rechargeable battery according to a first exemplary embodiment of the present disclosure, FIG. 2 illustrates an exploded perspective view of the rechargeable battery according to the first exemplary embodiment of the present disclosure, and FIG. 3 illustrates a longitudinal cross-sectional view taken along line III-III of FIG. 1.

Referring to FIGS. 1 to 3, a rechargeable battery 101 according to the first exemplary embodiment includes an electrode assembly 10, a case 20, a sealing portion 35, a cap plate 50, and a second terminal 31. For better understanding and convenience, the sealing portion 35 is not shown in FIGS. 1 and 2. In the following, a prismatic lithium ion rechargeable battery will be described as an example, but the present disclosure is not limited thereto, and may be applicable to various types of batteries such as a pouch battery, a lithium polymer battery, and the like.

The electrode assembly 10 included in the rechargeable battery 101 includes a band-shaped positive electrode (first electrode) 11, a band-shaped negative electrode (second electrode) 12, and a separator 13 disposed between the positive electrode 11 and the negative electrode 12, and it is formed as a spirally wound structure. That is, the electrode assembly 10 is flatly pressed after being spirally wound based on a winding axis while interposing the separator 13 between the positive electrode 11 and the negative electrode 12.

The positive electrode 11 includes a positive electrode current collector and a positive electrode active material layer coated on the positive electrode current collector, and the positive electrode current collector may be formed of a metal thin plate that is made of a material such as aluminum, while the positive electrode active material layer may be made of a lithium-based oxide.

The negative electrode 12 includes a negative electrode current collector and a negative active material layer coated on the negative electrode current collector, and the negative electrode current collector may be formed of a metal thin plate that is made of a material such as copper, while the negative active material layer may be made of a carbon-based active material.

The separator 13 may be formed of a porous thin film such as a polyolefin-based resin.

In this case, a positive electrode uncoated region 11a protruded toward a lateral surface 23 of the case may be formed on one lateral end of the electrode assembly 10, and a negative uncoated region 12a protruded toward an opening 25 of the case may be formed on another lateral end of the electrode assembly 10.

A number of the positive electrode uncoated regions 11a and the negative uncoated regions 12a may be respectively protruded and welded at one current collector (not shown) to be connected to the case, or a plurality of positive electrode uncoated regions 11a and negative uncoated regions 12a may be respectively protruded long in a band shape to be directly connected to the case, but the present disclosure is not limited thereto.

The case 20 is formed in a horizontal quadrangular pillar shape, a hole is formed in one lateral surface 23 of the case 20, and the opening 25 is formed on the other lateral surface facing the one lateral surface 23. In this case, the electrode assembly 10 is inserted into the case 20 through the opening 25. The case 20 includes an external circumferential surface 21 and the lateral surface 23 that is formed on one side of the case 20 and is connected to the external circumferential surface 21. The hole 26 is formed in a center portion of the lateral surface 23, and the hole 26 has a shape recessed to the electrode assembly 10 with respect to the lateral surface 23.

The electrode assembly 10 is disposed between the positive electrode uncoated region 11a and the negative uncoated region 12a, and the positive electrode uncoated region 11a is disposed at one side of the electrode assembly 10 and the negative uncoated region 12a is disposed at the other side of the electrode assembly 10.

The electrode assembly 10 may be inserted into the case 20 through the opening 25 while the positive electrode 11 is directed toward the hole 26.

The hole 26 may include a shape recessed to the electrode assembly 10, and the recessed shape may form a step with respect to a surface of the case 20. Specifically, the step may be formed so that a hole 26b formed in the lateral surface 23 of the case 20 is formed to be larger than a hole 26c with a shape recessed toward the electrode assembly 10 and thus a lateral wall 26a bent in a stepped shape is formed. Accordingly, when the hole 26 is formed to include the step and the sealing portion 35 is combined with the case 20, since the case 20 may be easily sealed by welding, process efficiency may be improved.

For better understanding of the present exemplary embodiment, the hole 26 of the lateral surface 23 of the case 20, which is formed to include the step, is enlarged and showed in FIG. 3. The sealing portion 35 and a bonding portion 11*ab* of the positive electrode uncoated region bonded to the sealing portion 35 are not shown for convenience in the enlarged portion of FIG. 3.

Referring to the enlarged portion of FIG. 3, the hole 26 formed in the lateral surface 23 of the case is formed in a shape recessed toward the electrode assembly 10. Specifically, the hole 26 includes the outer hole 26*b* formed in the lateral surface 23 of the case and the inner hole 26*c* formed to be recessed toward the electrode assembly 10. In the first exemplary embodiment of the present disclosure, since a lateral wall 26*bb* of the outer hole 26*b* and a lateral wall 26*cc* of the inner hole 26*c* are vertically connected, the hole 26 is formed to have the lateral wall 26*a* with a stepped shape perpendicular to the case lateral surface 23.

In other words, the hole 26 is formed to include a transverse cross-section of a polygonal shape in which two rectangles with different vertical widths are combined, and a distance between the lateral walls 26*cc* of the inner hole 26*c* formed to be recessed toward the electrode assembly 10 is shorter than that between the lateral walls 26*bb* of the outer hole 26*b* formed in the lateral surface 23 of the case. Accordingly, if the sealing portion 35 is manufactured to fit only the outer hole 26*b* of the lateral surface 23 of the case 20, the sealing portion 35 may be more easily manufactured.

In the exemplary embodiment of the present disclosure, the sealing portion 35 should be sealed so that the lateral surface 23 of the case 20 is flattened, that is, so that the lateral surface 23 of the case 20 is not protruded. Accordingly, it may be preferable that a thickness of the sealing portion 35 is substantially equal to a height of the lateral wall 26*bb* of the hole 26*b* formed in the lateral surface 23 of the case 20 among the lateral walls 26*a* of the stepped shape.

The sealing portion 35 may be formed in the same shape as the hole 26*b* to seal the outer hole 26*b* formed in the lateral surface 23 of the case 20, and it may be made of the same material as the case 20.

The bonding portion 11*ab* of the positive electrode uncoated region is bent to substantially have the same thickness as the hole 26*c* recessed from the lateral surface 23 of the case 20 toward the electrode assembly, specifically, to be sealed parallel to the sealing portion 35, and it is accommodated inside the inner hole 26*c*. Accordingly, a tilt connection portion 11*aa* formed to be tilted with respect to the external circumferential surface of the electrode assembly 10 and the bonding portion 11*ab* that is bent from the tilt connection portion 11*aa* and is welded to the sealing portion 35 are formed in the positive electrode uncoated region 11*a*.

The bonding portion 11*ab* of the positive electrode uncoated region 11*a* is directly welded to the sealing portion 35, and the sealing portion 35 is welded to the hole 26, such that the case 20 and the sealing portion 35 are charged as a positive electrode 11. Accordingly, since the case 20 can function as the positive electrode 11 without a separate positive electrode terminal, a space for forming a positive electrode terminal is not required in the battery module.

As described above, the positive electrode 11 is connected to the sealing portion 35, and the second terminal 31 is welded to be bonded to the negative electrode 12. Specifically, the second terminal 31 is bonded to the negative uncoated region 12*a* by welding, and is protruded to the outside while passing through a terminal hole 51 of the cap plate 50.

The second terminal 31 is welded to an outer surface of the negative uncoated region 12*a*, and the negative uncoated region 12 is bent to be disposed parallel to the second terminal 31 and the cap plate 50. Accordingly, a tilt connection portion 12*aa* formed to be tilted with respect to the external circumferential surface of the electrode assembly 10 and a bonding portion 12*ab* that is bent from the tilt connection portion 12*aa* and is welded to the second terminal 31 are formed in the negative uncoated region 12*a*.

Specifically, the second terminal 31 is fixed to the cap plate 50 with an insulating member 32 therebetween, and the insulating member 32 is disposed between the cap plate 50 and the second terminal 31 to electrically insulate the second terminal 31 from the cap plate 50. The negative uncoated region 12*a* is directly welded to one surface of the second terminal 31. In this case, the second terminal 31 may be formed in a rivet form in which ends of the second terminal 31 are widely spread by being pressed in a state for the second terminal 31 to pass through the terminal hole 51 formed in the cap plate 50.

According to the first exemplary embodiment, since the sealing portion 35 made of the same material as the case 20 is directly connected to the positive electrode 11 of the electrode assembly 10, a structure of the rechargeable battery may be simplified and thus a manufacturing cost thereof may be reduced, and a manufacturing process thereof may be simplified and thus productivity thereof may be improved.

As such, when the lateral surface 23 of the case is flatly sealed and a medium and large battery module is formed, the rechargeable batteries 101 of the present disclosure may be arranged in a compact structure. Further, when a cooling process is performed due to deterioration of respective rechargeable batteries 101, cooling efficiency may be easily improved by only circulating air and/or fluid without applying a separate coolant, thereby decreasing the cost of the cooling process.

Figure 4:
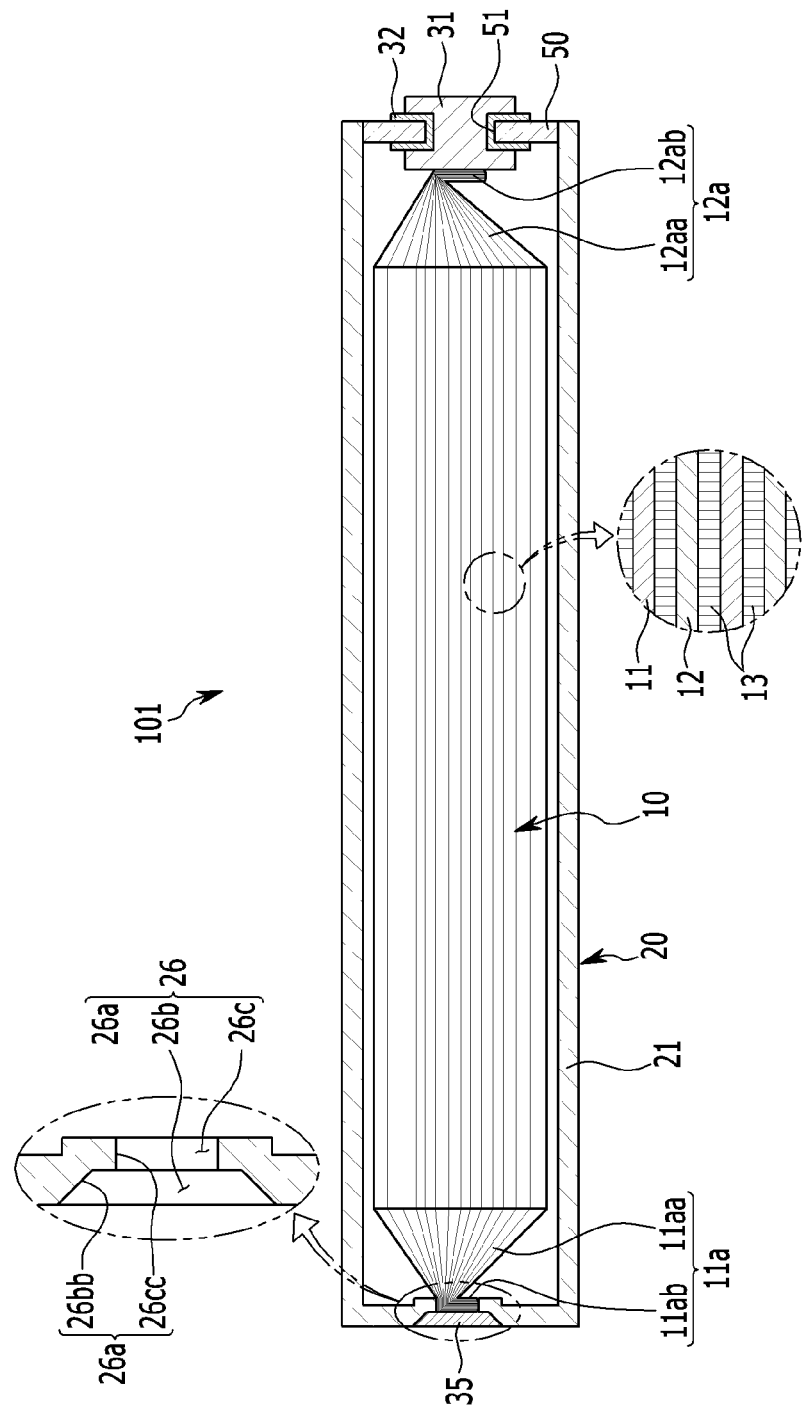
FIG. 4 illustrates a longitudinal cross-sectional view of a rechargeable battery according to a second exemplary embodiment of the present disclosure.

FIG. 4 illustrates a longitudinal cross-sectional view of a rechargeable battery according to a second exemplary embodiment of the present disclosure.

Referring to FIG. 4, since a rechargeable battery 101 according to the second exemplary embodiment includes the same structure as the rechargeable battery according to the first exemplary embodiment, except for a shape of a sealing portion 35 and a shape of a hole 26 formed in the lateral surface 23 of the case 20, a duplicate description of the same structure will be omitted.

The rechargeable battery 101 according to the second exemplary embodiment includes the electrode assembly 10, the case 20, the cap plate 50, the sealing portion 35, and the second terminal 31.

In this case, the sealing portion 35 is connected to the positive electrode 11, and the second terminal 31 is bonded to the negative electrode 12 by welding. The positive electrode uncoated region 11*a* is bonded to the sealing portion 35 by welding, and the sealing portion 35 is connected to the hole 26 to not be protruded from the lateral surface 23 of the case 20 and seals the hole 26. The second terminal 31 is bonded to the negative uncoated region 12*a* by welding and is protruded outside while passing through the cap plate 50.

The opening 25 of the case 20 is formed in an opposite lateral surface facing the lateral surface 23 where the hole 26 is formed in order to accommodate the electrode assembly 10, and the case 20 is formed to have a horizontal quadrangular pillar shape. In this case, the case 20 includes the external circumferential surface 21 and the lateral surface 23 that is formed in one side of the case 20, and is connected to the external circumferential surface 21. The hole 26 is formed in a center portion of the lateral surface 23, the sealing portion 35 is connected to the hole 26, and the sealing portion 35 is connected to the positive electrode 11 of electrode assembly 10 to be able to perform the function of the positive electrode 11 without a separate positive electrode terminal.

Referring to the enlarged portion of FIG. 4, the hole 26 is formed to have a shape recessed toward the electrode assembly 10. Specifically, the hole 26 includes an outer hole 26b formed in the lateral surface 23 of the case and the inner hole 26c recessed toward the electrode assembly. In the second exemplary embodiment of the present disclosure, the lateral wall 26bb of the outer hole 26b is formed to have a tilted surface, and the lateral wall 26cc of the inner hole 26c is formed to have the lateral wall 26cc perpendicular to the lateral surface 23 of the case.

In other words, the hole 26 is formed to include a transverse cross-section of a polygonal shape in which a square shape and a rectangle shape that have a tilted upper portion and a tilted lower portion are combined, the lateral wall 26bb of the outer hole 26b formed in the lateral surface 23 of the case is tilted for the vertical width thereof to narrow closer to the electrode assembly 10, and the lateral wall 26cc of the inner hole 26c recessed toward the electrode assembly 10 is formed to be perpendicular to the lateral surface 23 of the case 20.

Accordingly, the rechargeable battery according to the second exemplary embodiment of the present disclosure may have an advantage of more easily inserting the sealing portion 35 into the hole 26 of the lateral surface 23 of the battery case in addition to the above-mentioned advantages.

FIG. 5 illustrates a longitudinal cross-sectional view of a rechargeable battery according to a third exemplary embodiment of the present disclosure.

Referring to FIG. 5, since the rechargeable battery 101 according to the third exemplary embodiment includes the same structure as the rechargeable battery according to the first exemplary embodiment, except for a sealing portion 35 forming a first terminal 34 connected to the positive electrode 11 of the electrode assembly 10 and a bonding position at which the first terminal 34 and the positive electrode 11 of the electrode assembly 10 are bonded, a duplicate description of the same structure will be omitted.

The rechargeable battery 101 according to the third exemplary embodiment includes the electrode assembly 10, the case 20, the cap plate 50, the first terminal 34, and the second terminal 31. In this case, the electrode assembly 10 includes the positive electrode 11, the negative electrode 12, and the separator 13 disposed between the positive electrode 11 and the negative electrode 12, and the positive electrode coated region where an active material is coated and the positive electrode uncoated region 11a where the active material is not coated are formed in the positive electrode 11. A negative electrode coated region where the active material is coated and the negative uncoated region 12a where the active material is not coated are formed in the negative electrode 12.

The second terminal 31 is bonded to the negative uncoated region 12a by welding, and is protruded outside while passing through the cap plate 50. Since a structure of the second terminal 31 is the same as that of the first exemplary embodiment, a description thereof will be omitted.

The opening 25 of the case 20 is formed in an opposite lateral surface facing the lateral surface 23 where the hole 26 is formed in order to accommodate the electrode assembly 10, and the case 20 is formed to have a horizontal quadrangular pillar shape. The case 20 includes the external circumferential surface 21 and the lateral surface 23 connected to the external circumferential surface 21. The hole 26 with a step is formed in the lateral surface 23, and the first terminal 34 is inserted into the hole 26.

The hole 26 includes the outer hole 26b formed in the lateral surface 23 of the case and the inner hole 26c recessed toward the electrode assembly. In this case, since the lateral wall 26bb of the outer hole 26b and the lateral wall 26cc of the inner hole 26c are vertically connected, as a result, the hole 26 is formed to have the lateral wall 26a with a stepped shape perpendicular to the case lateral surface 23. In other words, the hole 26 is formed to include a transverse cross-section of a polygonal shape in which two rectangles with different vertical widths are combined, and a distance between the lateral walls 26cc of the inner hole 26c formed to be recessed toward the electrode assembly 10 is shorter than that between the lateral walls 26bb of the outer hole 26b formed in the lateral surface 23 of the case.

The first terminal 34 is formed in substantially the same shape as the above-described hole 26, and contacts both the surface 26bb and the surface 26cc, and is directly bonded to the bonding portion 11ab of the positive electrode 11 by welding. In this case, the welding can be performed by ultrasonic welding. The first terminal 34 passes through and is inserted into the hole 26 with the step, and the first terminal 34 is bonded to the lateral surface 23 to not be protruded from the lateral surface 23 of the case 20 so that the lateral surface 23 of the case 20 has a flattened shape.

As described above, the rechargeable battery according to the third exemplary embodiment of the present disclosure has advantages that the manufacturing process thereof is simplified and a contact area between the first terminal 34 and the case is enlarged because the first terminal 34 acts as the sealing portion, in addition to the above-mentioned advantages.

FIG. 6 illustrates a longitudinal cross-sectional view of a rechargeable battery according to a fourth exemplary embodiment of the present disclosure.

Referring to FIG. 6, since a rechargeable battery 101 according to the present exemplary embodiment has the same structure as the rechargeable battery according to the first exemplary embodiment, except for a sealing portion 35 forming a first terminal 34 connected to the positive electrode 11 of the electrode assembly 10 and a bonding position at which the first terminal 34 and the positive electrode 11 of the electrode assembly 10 are bonded, a duplicate description of the same structure will be omitted.

The rechargeable battery 101 according to the fourth exemplary embodiment includes the electrode assembly 10, the case 20, the cap plate 50, the first terminal 34, and the second terminal 31. In this case, the electrode assembly 10 includes the positive electrode 11, the negative electrode 12, and the separator 13, and the positive electrode coated region where an active material is coated and the positive electrode uncoated region 11a where the active material is not coated are formed in the positive electrode 11. A negative electrode coated region where the active material is coated and the negative uncoated region 12a where the active material is not coated are formed in the negative electrode 12.

The second terminal 31 is bonded to the negative uncoated region 12a by welding, and is protruded outside while passing through the cap plate 50. In this case, the insulating member 32 is disposed between the cap plate 50 and the second terminal 31. An insulating plate 37 is disposed below the cap plate 50 and is formed of a long rectangular plate, and one side of the second terminal 31 is inserted into the insulating plate 37. As such, when the insulating plate 37 is disposed, it is possible to prevent the negative uncoated region 12a from directly contacting the cap plate 50.

The opening 25 of the case 20 is formed in an opposite lateral surface facing the lateral surface 23 where the hole 26 is formed in order to accommodate the electrode assembly 10, and the case 20 is formed to have a horizontal quadrangular pillar shape. The case 20 includes the external circumferential surface 21 and the lateral surface 23 connected to the external circumferential surface 21. The hole 26 with a step is formed in the lateral surface 23, and the first terminal 34 is inserted into the hole 26.

The hole 26 includes the outer hole 26b formed in the lateral surface 23 of the case and the inner hole 26c recessed toward the electrode assembly. In this case, the lateral wall 26bb of the outer hole 26b is formed to have a tilted surface, and the lateral wall 26cc of the inner hole 26c is formed to be perpendicular to the lateral surface 23 of the case.

In other words, the hole 26 is formed to include a transverse cross-section of a polygonal shape in which a square shape and a rectangle shape that have a tilted upper portion and a tilted lower portion are combined, the lateral wall 26bb of the outer hole 26b formed in the lateral surface 23 of the case is tilted for the vertical width thereof to narrow closer to the electrode assembly 10, and the lateral wall 26cc of the inner hole 26c recessed toward the electrode assembly 10 is formed to be perpendicular to the lateral surface 23 of the case 20.

The first terminal 34 is formed in substantially the same shape as the above-described hole 26, and contacts both the surface 26bb and the surface 26cc, and may be directly bonded to the positive electrode uncoated region 11a by welding. Specifically, in the fourth exemplary embodiment, the first terminal 34 is welded to the bonding portion 11ab of the positive electrode uncoated region 11a, and the welding may be performed by ultrasonic welding. The first terminal 34 passes through and is inserted into the hole 26 with the step, and the first terminal 34 is bonded to the lateral surface 23 to not be protruded from the lateral surface 23 of the case 20 so that the lateral surface 23 of the case 20 has a flattened shape.

As described above, the rechargeable battery according to the fourth exemplary embodiment of the present disclosure has advantages that the first terminal 34 is easily inserted through a method inserting and putting the first terminal 34 into the hole 26, and that the manufacturing process thereof may be simplified and a contact area between the first terminal 34 and the case may be enlarged because the inserted and bonded first terminal 34 acts as a sealing portion, in addition to the above-mentioned advantages.

According to the first to fourth exemplary embodiments, the rechargeable battery that includes the structure in which only a single terminal is protruded from one side of the case by forming the hole with the step in the lateral surface of the case and by sealing the hole with the sealing portion or the first terminal directly and electrically connected to the positive electrode of the electrode assembly for the case lateral surface to be flattened in shape, may be manufactured.

Accordingly, when a battery module is configured with the rechargeable batteries according to the exemplary embodiments, the circuit for the battery module may be designed and formed even on a lateral area of the battery module depending on the designer's convenience, and an overall height of the battery module may decrease, while the rechargeable batteries may be arranged in a compact structure.

In addition, according to the exemplary embodiments, when a cooling process is performed due to deterioration of the rechargeable battery, cooling efficiency may be easily improved only by circulating air and/or fluid in the lateral surface of the case without applying a separate coolant.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A rechargeable battery comprising:
   an electrode assembly that includes a first electrode, a second electrode, and a separator interposed between the first electrode and the second electrode;
   a case that accommodates the electrode assembly, the case comprising an external circumferential surface, a first lateral surface in which a hole is formed and a second lateral surface in which an opening is formed, the second lateral surface facing the first lateral surface, the external circumferential surface and the first lateral surface formed as a single component;
   a sealing portion that forms a first terminal that is connected to the hole and seals the hole so that the first lateral surface of the case is flattened;
   a cap plate combined with the opening; and
   a second terminal that is connected to the second electrode and is protruded outside the case while passing through the cap plate,
   wherein the hole has a shape recessed toward the electrode assembly with respect to a surface of the case,
   wherein the hole comprises an outer hole and an inner hole, the outer and inner holes are formed in the first lateral surface of the case and the outer hole is larger than the inner hole, and
   wherein the first electrode connects to only a surface of the first terminal that faces the second lateral surface of the case and at a portion of the first terminal that is positioned within the hole.

2. The rechargeable battery of claim 1, wherein the recessed shape forms a step with respect to the surface of the case.

3. The rechargeable battery of claim 1, wherein the sealing portion is only positioned in the outer hole in the first lateral surface of the case.

4. The rechargeable battery of claim 1, wherein the sealing portion is positioned in both the outer hole and the inner hole in the first lateral surface of the case.

5. The rechargeable battery of claim 1, wherein the recessed shape includes a lateral wall perpendicular to the surface of the case.

6. The rechargeable battery of claim 1, wherein the recessed shape includes a lateral wall tilted to the surface of the case.

7. The rechargeable battery of claim 6, wherein the sealing portion has a tilted outer surface to contact the tilted lateral wall.

8. The rechargeable battery of claim 1, wherein the sealing portion is formed of the same material as the case and is directly bonded to an uncoated region formed in the first electrode.

9. The rechargeable battery of claim 1, wherein the sealing portion forms the first terminal and is connected to the first electrode.

10. The rechargeable battery of claim 9, wherein
the first terminal is formed to pass through the hole and is combined with the hole to not be protruded from the surface of the case.

11. The rechargeable battery of claim 1, wherein
an insulating member is disposed between the second terminal and the cap plate, and an uncoated region formed in the second electrode is directly combined with the second terminal.

\* \* \* \* \*